United States Patent [19]

Northrop et al.

[11] Patent Number: 4,745,323
[45] Date of Patent: May 17, 1988

[54] COMPACT FLUORESCENT LAMP WITH OUTER ENVELOPE

[75] Inventors: Donald P. Northrop, Glen Rock; Arpad L. Pirovic, Montvale, both of N.J.

[73] Assignee: Duro-Test Corporation, North Bergen, N.J.

[21] Appl. No.: 833,857

[22] Filed: Feb. 26, 1986

[51] Int. Cl.[4] .................. H01J 61/34; H01J 61/36
[52] U.S. Cl. ................................ 313/25; 313/318; 313/493; 313/634; 439/227; 315/71; 362/368
[58] Field of Search .............. 313/25, 493, 573, 634, 313/635, 318; 339/52 R; 362/368, 374, 375; 315/56, 58, 71; 439/227, 233, 236

[56] References Cited
U.S. PATENT DOCUMENTS

| D. 289,553 | 4/1987 | Gallagher | D26/3 |
| D. 289,928 | 5/1987 | Gallagher | D26/3 |
| 4,272,703 | 6/1981 | Eckberg | 313/493 X |
| 4,524,301 | 6/1985 | Cohen et al. | 313/634 X |
| 4,603,277 | 7/1986 | Inamura et al. | 313/25 |
| 4,611,148 | 9/1986 | Kato et al. | 313/25 X |

FOREIGN PATENT DOCUMENTS 63764 4/1982 Japan .................. 313/634

Primary Examiner—David K. Moore
Assistant Examiner—K. Wieder
Attorney, Agent, or Firm—Darby & Darby

[57] ABSTRACT

A compact fluorescent lamp of the twin tube or double twin type which is protected by an outer envelope mounted to the fluorescent lamp or the housing which contains the fluorescent lamp ballast. In a preferred embodiment the outer envelope is in the shape of an incandescent lamp envelope.

8 Claims, 1 Drawing Sheet

COMPACT FLUORESCENT LAMP WITH OUTER ENVELOPE

Compact type fluorescent lamps are becoming more widespread in use. Such lamps are adapted to be screwed into a standard incandescent lamp base and usually have a built-in ballast between the base connection and the lamp tube. Such compact fluorescent lamps are usually U-shaped and in a twin tube or double twin tube configuration. A typical lamp of this type is sold by Osram Corp. under catalog number 7W DULUX ® S While such lamps are relatively efficient in use, they have several drawbacks. First of all, they are not intended for outdoor operation since they are relatively unprotected. Accordingly, when used in a hostile environment, the ballast housing may deteriorate and the ballast become inoperative. Also, the fluorescent tube is unprotected and subject to breakage. In addition, some people object to the shape of such a lamp when used in an incandescent socket. Further, the characteristics of the light output of such a lamp is limited by its construction, i.e. the phosphor coating on the lamp envelope and the type of fill gas used. Some people do not consider the color of the light produced by such lamps to be pleasing.

The present invention relates to a novel combination of a compact type fluorescent lamp housed in a protective envelope. In a preferred embodiment, the protective envelope is a standard incandescent lamp envelope. The combination provides a simple device which has advantages such as protecting the fluorescent lamp from a hostile environment including operating the lamp in a colder environment than would normally be practical, and accidental breakage, providing an article which is more readily acceptable from the aesthetic point of view in certain situations, and also making available the ability to coat or color the outer envelope for practical or aesthetic purposes.

It is an object of the present invention to provide a compact fluorescent lamp housed in a protective envelope.

Another object is to provide a compact fluorescent lamp housed within an envelope having the shape of a conventional incandescent lamp.

A further object is to provide a compact fluorescent lamp which has the appearance of an incandescent lamp.

An additional object is to provide a compact fluorescent lamp with a protective arrangement having various practical and aesthetic advantages.

Other objects and advantages of the present invention will become more apparent upon reference to the following specification and annexed drawings in which.

Figure 1:
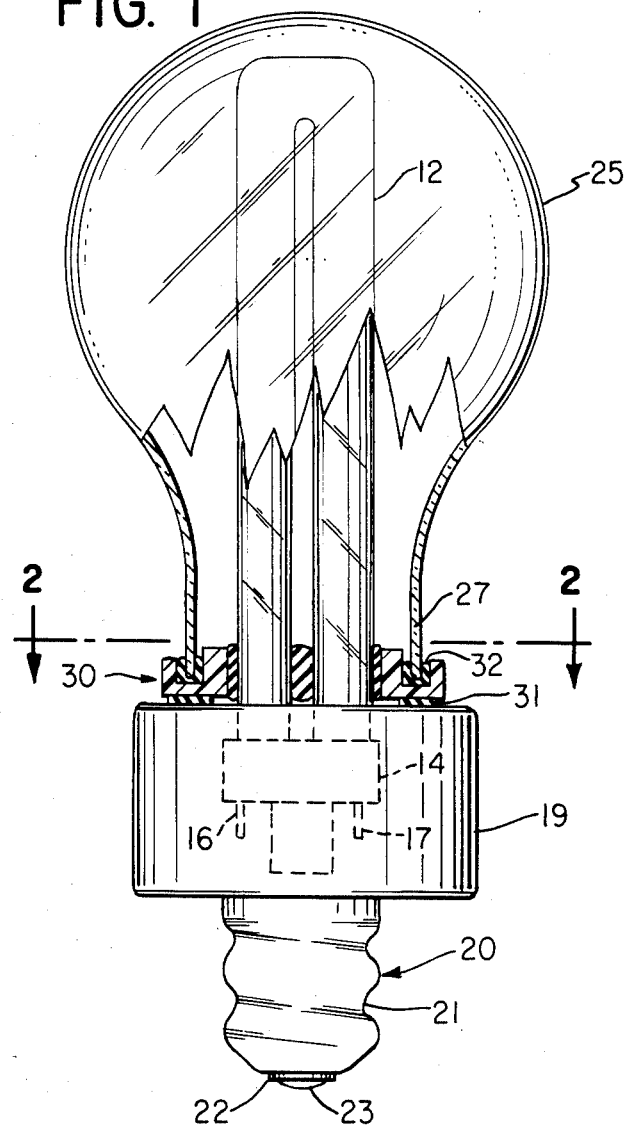
FIG. 1 is an elevational view of the lamp in accordance with the invention.

Referring to the drawings, a conventional twin tube or double twin tube compact fluorescent lamp 12 is provided having a base 14 at one end thereof. A twin tube lamp is shown. Base 14 is of insulating material and includes a pair of conductive contacts 16, 17 one at each end of the lamp tube to which electrical connection is made to the ballast 11. The ballast is mounted in a housing 19 of insulating material, for example, plastic. The ballast is of any conventional construction and which fits within the housing and not part of the present invention. A generally toroidal shaped ballast is shown.

A conventional incandescent lamp base 20 having the usual threaded outer conductive shell 21, bottom insulator 22 and conductive button contact 23 are provided. There are electrical leads (not shown) between the two conductive contacts 21 and 23 and the components of the ballast so that when the base 20 is screwed into an incandescent lamp socket, current is supplied through the ballast to the terminals 16–17 of the fluorescent lamp 12 and it is ignited so as to produce light. The foregoing construction is generally conventional.

In accordance with the invention, an outer envelope 25 is provided which in the preferred embodiment has the shape of a conventional incandescent lamp. The envelope can be of the type, for example, illustrated in American National Standards Institute C79.1 standards. The envelope 25 has an open neck 27 at its lower end. The only requirements for the neck 27 is that it be wide enough so that the fluorescent lamp 12 can pass therethrough.

The base of the envelope 25 is fastened by an adhesive in the groove 32 of an adaptor 30 which is in turn fastened to the lamp 12 at 33. The completed assembly plugs into the ballast housing 19 via the lamp base 14 and pins 16 and 17. The clearance between the adaptor 30 and ballast case 19 is sealed by an elastomer ring 31. This allows the lamp assembly to be replaced after end of life.

The adapter 30 is preferably made of a suitable electrically insulating plastic such as UV stabilized polycarbonate. The adapter is formed with the peripheral groove 32 which corresponds to the diameter and thickness of the open neck 27 of the envelope 25. The adapter 30 includes a central section 34 of somewhat greater height than its outer periphery to stabilize the mounted envelope 25. The adapter 30 also has a central opening 36 which is made somewhat larger than but of the same overall shape at the outside of the fluorescent tube 12 so that the tube can pass therethrough. In a typical twin tube compact fluorescent lamp configuration the opening 36 would be generally rectangular as shown in FIG. 2.

Figure 2:
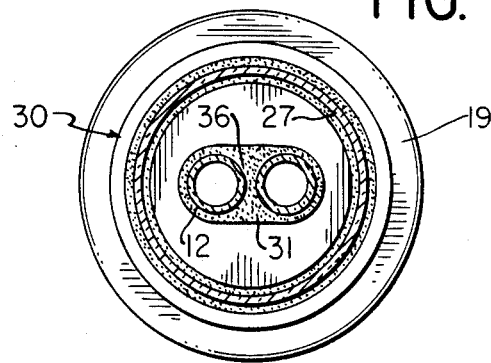
FIG. 2 is a cross-sectional view along lines 2—2 of FIG. 1 showing the adapter which aids in holding the outer envelope to the housing of the fluorescent lamp.

As seen in FIGS. 1 and 2, the fluorescent tube 12 passes through the opening 36 of the bulb adapter 30 and into the neck 22 of envelope 25. The envelope neck 27 is sealed in the adapter peripheral groove 32 by a suitable elastomer. To fasten the adapter 30 to the lamp 12 a washer 31 of elastomeric material fits into the adapter opening 36 and surrounds the tube 12. If a split washer is used, it can be sealed with an elastomeric adhesive which will also be used to fasten the adapter to the tube 12. If no washer is used the elastomer also can be applied in bulk into the space between the outside of the tubes and the adapter and the space between the two tubes. The elastomer adhesive used in the assembly should be a flexible type, for example silicon RTV, to allow for component expansion and shock absorbing during handling and use.

Any conventional incandescent lamp coating, pigment or finish can be used on either the inner or the outer wall of the incandescent lamp envelope to modify the characteristics of the light output.

As should be apparent, the subject invention provides several advantages relative to the fluorescent tube 12. First of all, the fluorescent lamp is protected by the envelope 25 from the environment. Also the opening into the ballast housing 19 is protected by the envelope and sealed by the combination of the adapter 30 and the various elastomer seals. In addition, use of an RTV type elastomer and the adapter 30 provides shock absorbing for the fluorescent tube 12 in rugged environment applications.

A one piece unit can be made by having a groove 32 molded into the top surface of the ballast case 19. The groove can be either recessed below the top surface of the housing or raised above it. In this case the lamp 12 is plugged into the ballast case 19 and the envelope 25 is cemented into place within the groove 32.

As should be apparent, the end product outwardly looks like an incandescent lamp, which some people find to be more aesthetically pleasing. If certain coatings are used on the envelope 25, then the light which the viewer sees may be made colored and more warm than would normally be produced by an incandescent lamp envelope, etc.

What is claimed is:

1. The combination comprising:
    a self-contained fluorescent lamp unit having terminals thereon for electrical connection to a ballast means,
    a housing having a wall with an opening therein;
    electrical circuit ballast means within said housing;
    means for detachably electrically connecting said lamp unit terminals to said ballast means with the terminals of said lamp unit extending through the opening of said housing wall,
    an envelope having an open neck portion through which said lamp unit passes into the envelope interior.
    and adapter means having a lower part for placement over said opening of said housing wall and a portion through which said lamp unit extends into said envelope, said envelope neck portion mechanically coupled to an upper part of said adapter means whereby said envelope and adapter are detachable as an assembly from said housing and said lamp unit is accessible for detachment from said housing.

2. The combination of claim 1 further comprising means in said portion of said adapter through which said lamp extends for mechanically coupling said lamp to said adapter whereby said envelope, adapter and lamp can be detached as a unit.

3. The combination of claim 1 wherein said envelope has the general shape of an incandescent lamp envelope.

4. The combination of claim 2 wherein said envelope has the general shape of an incandescent lamp envelope.

5. The combination of claim 1 further comprising an adhesive sealant for mounting said neck portion on said adapter.

6. The combination of claim 5 wherein said adhesive sealant is resilient to provide shock absorbing properties.

7. The combination of claim 1 wherein said adapter has a peripheral groove into which the envelope neck fits and a central opening through which the lamp unit passes.

8. The combination of claim 7 further comprising an adhesive sealant for mounting the neck of said envelope in said groove.

* * * * *